United States Patent
Petti (10) Patent No.: US 8,844,747 B2
(45) Date of Patent: Sep. 30, 2014

(54) AND TEMPERATURE INDICATING CAN ENDS AND TABS

(75) Inventor: Michael A. Petti, Buffalo Grove, IL (US)

(73) Assignee: Rexam Beverage Can Company, Chicago, IL (US)

( * ) Notice: Subject to any disclaimer, the term of this patent is extended or adjusted under 35 U.S.C. 154(b) by 773 days.

(21) Appl. No.: 12/727,873

(22) Filed: Mar. 19, 2010

(65) Prior Publication Data

US 2011/0226636 A1 Sep. 22, 2011

(51) Int. Cl.
| | | |
|---|---|---|
| B65D 17/34 | (2006.01) | |
| G01K 11/12 | (2006.01) | |
| G01K 3/04 | (2006.01) | |
| B65D 79/02 | (2006.01) | |
| B65D 17/00 | (2006.01) | |
| B41M 5/24 | (2006.01) | |

(52) U.S. Cl.
CPC .............. *B65D 17/165* (2013.01); *G01K 11/12* (2013.01); *G01K 2207/04* (2013.01); *G01K 3/04* (2013.01); *B65D 79/02* (2013.01); *B41M 5/24* (2013.01); *Y10S 220/906* (2013.01)
USPC ........... 220/270; 220/906; 215/230; 374/141; 374/159

(58) Field of Classification Search
USPC ........ 220/906, 269, 270; 215/230; 206/495.1, 206/216, 217; 413/14; 40/306; 374/141, 374/159; 116/216, 207
See application file for complete search history.

(56) References Cited

U.S. PATENT DOCUMENTS 1,257,710 A   2/1918   Januchowsky
1,878,541 A   9/1932   Reinhold
(Continued)

FOREIGN PATENT DOCUMENTS

AU   81794/94 A   9/1995
DE   29716186 U1   11/1997
(Continued)

OTHER PUBLICATIONS

Rexam Beverage Can Company, International Search Report issued from the European Patent Office in co-pending PCT Application No. PCT/US2011/027942, mailed Jul. 13, 2011.

(Continued)

*Primary Examiner* — Steven A. Reynolds
*Assistant Examiner* — Javier A Pagan
(74) *Attorney, Agent, or Firm* — Ungaretti & Harris LLP (57) ABSTRACT

A metallic can end for a container is described. The metallic can end has a curl defining an outer perimeter of the can end. A wall extends downwardly from the curl. A strengthening member is joined to a lowermost end of the wall. A center panel is joined to the strengthening member and is centered about a longitudinal axis. The center panel has a product side and a public side. A rivet is located on the center panel. A displaceable tear panel is on the center panel. The tear panel is at least substantially defined by a frangible score and a non frangible hinge segment. A non-detachable tab is staked to the center panel by the rivet. The non-detachable tab has a nose end extending over a portion of the tear panel, a lift end opposite the nose end, and a central webbing between the nose and lift end. The webbing has a hinge region and a rivet island surrounding the rivet. The rivet island is at least partially surrounded by a first void region to provide a first exposed area of the center panel. A first temperature indicator has a first thermochromic material which undergoes a color change upon reaching a first predetermined temperature. The first temperature indicator is located on the non-detachable tab.

33 Claims, 5 Drawing Sheets

(56) References Cited

U.S. PATENT DOCUMENTS

| | | |
|---|---|---|
| 2,866,338 A | 12/1958 | Muncheryan |
| D212,462 S | 10/1968 | Peters et al. |
| D215,415 S | 9/1969 | Peters et al. |
| 3,559,842 A | 2/1971 | Rich |
| D221,736 S | 9/1971 | Jacobs et al. |
| D224,964 S | 10/1972 | Saunders |
| D226,072 S | 1/1973 | Saunders |
| D228,344 S | 9/1973 | Markert |
| 3,822,496 A | 7/1974 | Minder |
| 4,083,471 A | 4/1978 | Frank |
| 4,203,240 A * | 5/1980 | Goodwin ............... 40/310 |
| 4,232,797 A | 11/1980 | Waterbury |
| 4,322,016 A | 3/1982 | Barrash |
| 4,380,129 A | 4/1983 | Barrash |
| 4,459,910 A | 7/1984 | Taube |
| 4,557,505 A | 12/1985 | Schaefer et al. |
| D289,017 S | 3/1987 | Spangler et al. |
| 4,880,137 A | 11/1989 | Wells |
| 5,191,695 A | 3/1993 | Pavely et al. |
| 5,215,864 A | 6/1993 | Laakmann |
| D338,413 S | 8/1993 | Ciambella |
| 5,316,166 A | 5/1994 | Pavely et al. |
| 5,359,766 A | 11/1994 | Pavely et al. |
| D365,021 S | 12/1995 | Park |
| 5,655,678 A | 8/1997 | Kobayashi |
| 5,720,555 A * | 2/1998 | Elele ............... 374/150 |
| 5,741,105 A | 4/1998 | Schubert et al. |
| 5,799,815 A | 9/1998 | Lang |
| 5,855,969 A | 1/1999 | Robertson |
| 5,928,126 A | 7/1999 | Guillot |
| 5,967,726 A | 10/1999 | Turner et al. |
| 5,996,832 A | 12/1999 | Nieuwoudt |
| 5,997,849 A | 12/1999 | Small et al. |
| D422,211 S | 4/2000 | Sedgeley |
| D423,932 S | 5/2000 | Miura |
| 6,080,958 A | 6/2000 | Miller et al. |
| 6,105,806 A | 8/2000 | Stasiuk |
| 6,139,779 A | 10/2000 | Small et al. |
| 6,161,717 A | 12/2000 | Forrest et al. |
| 6,202,880 B1 | 3/2001 | Strube et al. |
| 6,433,302 B1 | 8/2002 | Miller et al. |
| 6,476,349 B1 | 11/2002 | Jendick |
| 6,485,824 B2 * | 11/2002 | Senga et al. ............... 428/323 |
| 6,498,318 B1 | 12/2002 | Miller et al. |
| 6,501,046 B1 | 12/2002 | Miller et al. |
| 6,579,006 B1 | 6/2003 | Pariseau |
| 6,590,183 B1 | 7/2003 | Yeo |
| 6,634,516 B2 | 10/2003 | Carballido |
| 6,706,995 B2 * | 3/2004 | Miller et al. ............ 219/121.68 |
| 6,772,900 B2 * | 8/2004 | Turner et al. ............... 220/269 |
| 6,777,098 B2 | 8/2004 | Yeo |
| 6,808,351 B1 | 10/2004 | Brown et al. |
| 6,854,947 B2 | 2/2005 | Lee |
| 6,868,627 B2 | 3/2005 | Elias |
| 6,926,487 B1 | 8/2005 | Jendick |
| 6,929,136 B2 | 8/2005 | Salazar-Leal |
| 6,951,293 B2 | 10/2005 | Thibaut |
| D530,604 S | 10/2006 | Huckel |
| D531,899 S | 11/2006 | Huckel |
| D533,775 S | 12/2006 | Huckel |
| 7,537,129 B2 | 5/2009 | Bayss et al. |
| 7,594,584 B2 | 9/2009 | Durdon et al. |
| 2003/0127415 A1 | 7/2003 | Carballido |
| 2003/0178397 A1 | 9/2003 | Jendick |
| 2005/0045637 A1 * | 3/2005 | Rohr et al. ............... 220/269 |
| 2005/0258175 A1 | 11/2005 | Robertson |
| 2006/0140746 A1 | 6/2006 | Koon |
| 2006/0151501 A1 | 7/2006 | Chang et al. |
| 2009/0041083 A1 | 2/2009 | McParland |
| 2009/0284732 A1 | 11/2009 | Vitale |
| 2010/0078010 A1 * | 4/2010 | Kolb ............... 126/263.08 |
| 2010/0193519 A1 | 8/2010 | Forrest et al. |

FOREIGN PATENT DOCUMENTS

| | | |
|---|---|---|
| DE | 19701547 A1 | 3/1998 |
| EP | 0923457 B1 | 6/1999 |
| EP | 1123772 A1 | 8/2001 |
| EP | 1663794 B1 | 1/2007 |
| FR | 2649628 A3 | 1/1991 |
| GB | 2105257 A | 3/1983 |
| GB | 2185613 A | 7/1987 |
| GB | 2320008 A | 6/1998 |
| JP | 3146174 | 6/1991 |
| JP | 5178346 A | 7/1993 |
| WO | 98/10945 A1 | 3/1998 |
| WO | 99/09853 A2 | 3/1999 |
| WO | 99/58407 A1 | 11/1999 |
| WO | 00/03832 A1 | 1/2000 |
| WO | 00/47487 A1 | 8/2000 |
| WO | 01/68460 A2 | 9/2001 |
| WO | 0228730 A1 | 4/2002 |
| WO | 02076759 A1 | 10/2002 |
| WO | 2005/021392 A1 | 3/2005 |
| WO | 2007021294 A1 | 2/2007 |

OTHER PUBLICATIONS

Turner, Timothy L., et al., "Promotional Tabs for Container Ends," non-published U.S. Appl. No. 09/156,563 deposited Sep. 17, 1998.
Rexam Beverage Can Company, International Search Report from pending Application No. PCT/US2010/023055 mailed Mar. 25, 2010 from the European Patent Office acting as International Searching Authority.

* cited by examiner

AND TEMPERATURE INDICATING CAN ENDS AND TABS

CROSS-REFERENCE TO RELATED APPLICATIONS

N/A

FEDERALLY SPONSORED RESEARCH OR DEVELOPMENT

N/A

TECHNICAL FIELD

The invention relates to beverage containers. More particularly, the invention relates to can ends or lids including stay-on tabs having ornamentation.

BACKGROUND OF THE INVENTION

Typical end closures for beer and beverage containers have an opening panel and an attached leverage tab for pushing the opening panel into the container to open the end. The container is typically a drawn and ironed metal can, usually constructed from a thin plate of aluminum or steel. End closures for such containers are also typically constructed from a cutedge of thin plate of aluminum, formed into a blank end, and manufactured into a finished end by a process often referred to as end conversion. These ends are formed in the process of first forming a cutedge of thin metal, forming a blank end from the cutedge, and converting the blank into an end closure which may be seamed onto a container.

These types of container ends have been used for many years, with almost all such ends in use today being the "ecology" or "stay-on-tab" ("SOT") ends in which the tab remains attached to the end after a tear panel, including large-opening ends ("LOE"), is opened. The tear panel being a portion of the can end defined by a score length. The tear panel may be opened, that is the score may be severed, and the tear panel displaced at an angular orientation relative to the remaining portion of the can end. The tear panel remains hingeably connected to the remaining portion of the can end by a hinge segment, leaving an opening through which the user draws the contents of the container. In an LOE, the opening is at least 0.5 square inches in area.

Opening of the tear panel is operated by the tab which is attached to the can end by a rivet. The tab is attached to the can end such that a nose of the tab extends over a proximal portion of the tear panel. A lift end of the tab is located opposite the tab nose and provides access for a user to lift the lift end, such as with the user's finger, to force the nose against the proximal portion of the tear panel.

When the tab nose is forced against the tear panel, the score initially ruptures at a vent region of the score. This initial rupture of the score is primarily caused by the lifting force on the tab resulting in lifting of a central region of the can end, immediately adjacent the rivet. As the tab is lifted further, the score rupture propagates along the length of the score, eventually stopping at the hinge segment.

Tabs are often also used to convey information to users. This information may be in the form of promotional materials, logos, or the like. Methods such as printing, incising, laser ablation, stamping, etc. have been employed to provide information on the tabs. To date, none of these methods has been widely accepted.

Some publications dedicated to methods of conveying information to a user in conjunction with beverage containers include: U.S. Publication No. 2006/0151501 which discloses a protective sanitary film for coating a can lid; U.S. Pat. No. 1,257,710 which describes a crimped bottle cap; U.S. Pat. No. 4,380,129 which described information-bearing tabs; U.S. Pat. No. 1,878,541 which describes an impressed cap; U.S. Pat. No. 4,203,240 which describes placing indicia on a beverage container; U.S. Pat. No. 4,459,910 which describes an embossing machine having upper tooling including multiple embossing stamps and lower tooling including an anvil only; U.S. Pat. No. 4,557,505 which discloses tamper evident tape; U.S. Pat. No. 5,191,695 which discloses a token which is insertable into the finger hole of a tab, which token may be marked by molding, embossing, hot die stamping, or ink jet printing where embossing is used only when thickness of tab is so great that indicia will not show through; U.S. Pat. No. 5,316,166 which is similar to U.S. Pat. Nos. 5,191,695; 6,080,958, 6,433,302, 6,501,046, 6,706,995 and 6,498,318 which describe marking tabs with embossing via stamping or incising; U.S. Pat. No. 6,105,806 which is primarily dedicated to a laser etched image on a tab; U.S. Pat. No. 6,202,880 which discloses a second score having a shape and laser markings; U.S. Pat. No. 6,777,098 which discloses laser marking an anodized aluminum; and U.S. Pat. No. 6,868,627 which describes indicia on a tab which indicia may consist of a mark, shape, depression, cut, mold, impression.

Other publications which may be relevant to providing indicia on non-detachable tabs include AU-784218, DE-19701547, DE-29716186, EP-0923457, GB-2105257, JP-3146174, WO-00/03832, WO-01/68460, WO-98/10945, and WO-99/09853.

Co-pending and commonly assigned U.S. application Ser. No. 12/365,696 also describes methods of decorating and strengthening can end tabs.

The development of thermochromic materials, such as those discussed in U.S. Pat. No. 5,928,126, has opened up new possibilities for the conveyance of information and decorative capabilities of can makers. However, to become a marketing tool, the thermochromic materials must be deposited in several layers, typically 3 to 4. Unfortunately, adding 3 to 4 layers of decoration to a can body or can lids is impractical and not advantageous to can makers for manufacturing reasons. For instance, the decorative ink on a can body is typically 0.8 microns to 1.5 microns thick. Unfortunately, ink carrying thermochromic materials does not look acceptable until it is preferably 2.5 microns to 5 microns thick. Such thickness cannot be achieved on can bodies in a typical manufacturing process. Thus, can bodies having thermochromic material deposited thereon have yet to become commercially successful.

The present invention is provided to solve the problems discussed above and other problems, and to provide advantages and aspects not provided by prior can end tabs of this type. A full discussion of the features and advantages of the present invention is deferred to the following detailed description, which proceeds with reference to the accompanying drawings.

SUMMARY OF THE INVENTION

A first aspect of the present invention is directed to a metallic can end for a container. The metallic can end for a container comprises: a curl defining an outer perimeter of the can end; a wall extending downwardly from the curl; a strengthening member joined to a lowermost end of the wall; a center panel joined to the strengthening member centered about a longitudinal axis, and having a product side, a public side, and a means for opening the can end comprising a selectively openable closure member; and a first temperature indicating means comprising a first thermochromic material which undergoes a color change upon reaching a first predetermined temperature.

Further, the can end of the first aspect of the invention may include one or more of the following additional features, alone or in any reasonable combination. The metallic can end may further comprise: a second temperature indicating means comprising a second thermochromic material which undergoes a color change upon reaching a second predetermined temperature. At least one of the first temperature indicating means and the second temperature means may undergo a permanent color change upon reaching a corresponding temperature of the first predetermined temperature and the second predetermined temperature. The metallic can end may further comprise: a third temperature indicating means comprising a third thermochromic material which undergoes a color change upon reaching a third predetermined temperature different from at least one of the first predetermined temperature and the second predetermined temperature. At least two of the first temperature indicating means, the second temperature means and the third temperature means may undergo a permanent color change within a corresponding temperature of the first predetermined temperature, the second predetermined temperature, and the third predetermined temperature. One of the first, second, and third temperature means undergoing the permanent color change may have a permanent color change activated at a temperature greater than 60° F. The other of the first, second, and third temperature means undergoing the permanent color change may have a permanent color change activated at a temperature less than 60° F. At least one of the first, second, and third temperature means may be located on a portion of the can end. The metallic can end may further comprise: a rivet in the center panel; a displaceable tear panel on the center panel at least substantially defined by a frangible score and a non frangible hinge segment; and a non-detachable tab staked to the panel by the rivet, the non-detachable tab having a nose end extending over a portion of the tear panel, a lift end opposite the nose end, and a central webbing between the nose and lift end, the webbing having a hinge region and a rivet island surrounding the rivet, the rivet island being at least partially surrounded by a first void region to provide a first exposed area of the center panel wherein at least one of the first, second, and third temperature indicating means is located on the non-detachable tab. At least two of the first, second, and third temperature indicating means may be located on the non-detachable tab. The first, second, and third temperature indicating means may be located on the non-detachable tab.

Another aspect of the present invention is also directed to a metallic can end for a container. The metallic can end comprises: a curl defining an outer perimeter of the can end; a wall extending downwardly from the curl; a strengthening member joined to a lowermost end of the wall; a center panel joined to the strengthening member centered about a longitudinal axis, and having a product side, a public side, rivet; and a displaceable tear panel at least substantially defined by a frangible score and a non frangible hinge segment; a non-detachable tab staked to the panel by the rivet, the non-detachable tab having a nose end extending over a portion of the tear panel, a lift end opposite the nose end, and a central webbing between the nose and lift end, the webbing having a hinge region and a rivet island surrounding the rivet, the rivet island being at least partially surrounded by a first void region to provide a first exposed area of the center panel; and a plurality of temperature indicating means each comprising a thermochromic material located on a portion of the metallic can end, wherein each of the plurality of temperature indicating means undergoes a color change upon reaching a predetermined temperature, and wherein at least one of the plurality of temperature indicating means undergoes a color change upon reaching a temperature at least 10° F. different from another of the plurality of temperature indicating means.

Further, the can end of the second aspect of the invention may include one or more of the following additional features, alone or in any reasonable combination. At least one of the plurality of temperature indicating means may undergo a permanent color change upon reaching a corresponding predetermined temperature. At least one of the plurality of temperature indicating means may undergo a temporary color change upon reaching a corresponding predetermined temperature. At least two of the plurality of temperature indicating means may undergo color changes within a temperature range no greater than 10° F. All of the plurality of temperature indicating means may undergo color changes at different temperatures. The can end may further comprise: a substantially enclosed grab portion of the non-detachable tab between the first void region and the lift end of the tab wherein at least one of the plurality of temperature indicating means is located on the substantially enclosed grab portion. The substantially enclosed grab portion may define a billboard surface having a top side and a bottom side opposite the top side. A width of the non-detachable tab across the billboard surface may be at least 50% greater than a width of the tab across the rivet and wherein the billboard surface may comprise two or more of the plurality of temperature indicating means on a bead created by a displaced portion of the central webbing located on the billboard surface and wherein the bead may include a tactile indicium located on the billboard surface. The plurality of temperature indicating means may overlap each other, and portions of an outermost layer may be removed to reveal at least one layer below the outermost layer. The portions of an outermost layer may be removed by laser ablation.

A third aspect of the present invention is directed to a metallic can end for a container. The can end comprises: a curl defining an outer perimeter of the can end; a wall extending downwardly from the curl; a strengthening member joined to a lowermost end of the wall; a center panel joined to the strengthening member centered about a longitudinal axis, and having a product side and a public side; a rivet in the center panel; a displaceable tear panel on the center panel at least substantially defined by a frangible score and a non frangible hinge segment; a non-detachable tab staked to the panel by the rivet, the non-detachable tab having a nose end extending over a portion of the tear panel, a lift end opposite the nose end, and a central webbing between the nose and lift end, the webbing having a hinge region and a rivet island surrounding the rivet, the rivet island being at least partially surrounded by a first void region to provide a first exposed area of the center panel; and a first temperature indicating means comprising a first thermochromic material which undergoes a color change upon reaching a first predetermined temperature and located on the non-detachable tab.

The can end of the third aspect of the present invention may include one or more of the following features, alone or in any reasonable combination. The can end may further comprise: a second temperature indicating means comprising a second thermochromic material which undergoes a color change upon reaching a second predetermined temperature. At least one of the first temperature indicating means and the second temperature means may undergo a permanent color change upon reaching a corresponding temperature of the first predetermined temperature and the second predetermined temperature. The can end may further comprise: a third temperature indicating means comprising a third thermochromic material which undergoes a color change upon reaching a third predetermined temperature different from at least one of the first predetermined temperature and the second predetermined temperature. At least two of the first temperature indicating means, the second temperature means, and the third temperature indicating means may undergo a permanent color change upon reaching a corresponding temperature of the first predetermined temperature, the second predetermined temperature, and the third predetermined temperature. One of the first, second, and third temperature means undergoing the permanent color change may have a permanent color change activated at a temperature greater than 60° F. The other of the first, second, and third temperature means undergoing the permanent color change may have a permanent color change activated at a temperature less than 60° F. At least one of the second and third temperature means may be located on a portion of the can end other than the non-detachable tab. At least two of the first, second, and third temperature indicating means may be located on the non-detachable tab. The first, second, and third temperature indicating means may be located on the non-detachable tab. The can end may further comprise: a substantially enclosed grab portion of the non-detachable tab between the first void region and the lift end of the tab wherein the first temperature indicating means is located on the substantially enclosed grab portion. The can end may further comprise: a second temperature indicating means comprising a second thermochromic material which undergoes a color change upon reaching a second predetermined temperature wherein at least one of the first temperature indicating means and the second temperature means undergoes a permanent color change upon reaching a corresponding temperature of the first predetermined temperature and the second predetermined temperature and wherein the second temperature indicating means is located on the substantially enclosed grab portion. The can end may further comprise: a bead created by a displaced portion of the central webbing located on the substantially enclosed grab portion, the bead including a tactile indicium located on the substantially enclosed grab portion wherein at least one of the first temperature indicating means and the second temperature means forms a layer on the tactile indicium. Both the first temperature indicating means and the second temperature means may form layers on the tactile indicium. Both the layers of the first temperature indicating means and the second temperature means may overlap. The tactile indicium may comprise relief features of the tab material on the top and bottom sides.

A fourth aspect of the invention is also directed to a metallic can end for a container. The can end comprises: a curl defining an outer perimeter of the can end; a wall extending downwardly from the curl; a strengthening member joined to a lowermost end of the wall; a center panel joined to the strengthening member centered about a longitudinal axis, and having a product side, a public side, and a means for opening the can end comprising a selectively openable closure member; a first temperature indicating means comprising a first thermochromic material which undergoes a color change upon reaching a first predetermined temperature; and a second temperature indicating means comprising a second thermochromic material which undergoes a color change upon reaching a second predetermined temperature wherein at least one of the first temperature indicating means and the second temperature means undergoes a permanent color change upon reaching a corresponding temperature of the first predetermined temperature and the second predetermined temperature.

The can end of the fourth aspect of the invention may further include one or more of the following features, alone or in any reasonable combination. The can end may further comprise: a third temperature indicating means comprising a third thermochromic material which undergoes a color change upon reaching a third predetermined temperature different from at least one of the first predetermined temperature and the second predetermined temperature. At least two of the first temperature indicating means, the second temperature means, and the third temperature indicating means may undergo a permanent color change upon reaching a corresponding temperature of the first predetermined temperature, the second predetermined temperature, and third predetermined temperature. One of the first, second, and third temperature means undergoing the permanent color change may have a permanent color change activated upon reaching a temperature greater than 60° F. Another of the first, second, and third temperature means undergoing the permanent color change may have a permanent color change activated within a temperature range having a maximum temperature less than 60° F.

Another aspect of the present invention is directed to a non-detachable tab for a beverage container lid comprising: a nose end; a lift end opposite the nose end; a central webbing between the nose and lift end, the webbing having a hinge region and a rivet island surrounding a rive hole rivet, the rivet island being at least partially surrounded by a first void region; and a coating on the non-detachable tab covering the nose end, the lift end, and the central webbing of the tab wherein the coating comprises at least three layers of a cured fluid comprising a thermochromic material. The layers of this aspect of the invention may include one or more of the thermochromic material characteristics described in conjunction with the other aspects of the invention.

Another aspect of the invention is directed to a non-detachable tab for a beverage container lid comprising: a nose end; a lift end opposite the nose end; a central webbing between the nose and lift end, the webbing having a hinge region and a rivet island surrounding a rive hole rivet, the rivet island being at least partially surrounded by a first void region; and a coating on the non-detachable tab covering the nose end, the lift end, and the central webbing of the tab wherein the coating comprises a layer of a cured fluid comprising a thermochromic material.

This aspect of the invention may include one or more of the following features, alone or in any reasonable combination. The coating may comprise a plurality of layers of cured fluids comprising thermochromic characteristics. The coating may comprise a first layer, a second layer, and a third layer, each layer comprising a cured fluid comprising a thermochromic characteristic. Each layer may undergo a change in color upon reaching a different predetermined temperature. First, second, and third layers may undergo different color changes upon reaching a corresponding predetermined temperature. First, second, and third layers may undergo different color changes upon reaching a corresponding predetermined temperature and wherein said corresponding predetermined temperatures are not equal. First, second, and third layers may undergo different color changes upon reaching a corresponding predetermined temperature and wherein said corresponding predetermined temperatures are equal. Portions of one or more of first, second and third layers may be treated with a laser to ablate portions of the layers. The coating may have a thickness greater than 1.5 microns. The coating may have a thickness between 2.5 and 5 microns. The coating may have a thickness between 5 and 10 microns.

Other features and advantages of the invention will be apparent from the following specification taken in conjunction with the following drawings.

BRIEF DESCRIPTION OF THE DRAWINGS

To understand the present invention, it will now be described by way of example, with reference to the accompanying drawings in which.

DETAILED DESCRIPTION

While this invention is susceptible of embodiments in many different forms, there is shown in the drawings and will herein be described in detail preferred embodiments of the invention with the understanding that the present disclosure is to be considered as an exemplification of the principles of the invention and is not intended to limit the broad aspect of the invention to the embodiments illustrated.

Referring to the figures, the end closure 10 for a container (not shown) has a central panel wall 12 having a seaming curl 14 for joining the end closure 10 to the container. The container is typically a drawn and ironed metal can, usually constructed from a thin plate of aluminum or steel. End closures for such containers are also typically constructed from a cutedge of thin plate of aluminum or steel, formed into blank end, and manufactured into a finished end by a process often referred to as end conversion. In the embodiments shown in the figures, the central panel 12 is joined to a container by a seaming curl 14 which is joined to a mating curl of the container. The seaming curl 14 of the end closure 10 is integral with the central panel 12 by a downwardly extending wall 15 and a strengthening member 16, typically either a countersink or a fold, which is joined to the panel outer edge 18 of the central panel 12. This type of means for joining the central panel 12 to a container is presently the typical means for joining used in the industry, and the structure described above is formed in the process of forming the blank end from a cutedge of metal plate, prior to the end conversion process. However, other means for joining the central panel to a container may be employed with the present invention.

The steps of manufacturing the end 10 begin with blanking the cutedge, typically a round or non-round cutedge of thin metal plate. Examples of non-round cutedge blanks include elliptical cutedges, convoluted cut edges, and harmonic cut edges. A convoluted cutedge may be described as generally having three distinct diameters, each diameter being 45° relative to the others. The cutedge is then formed into a blank end by forming the seaming curl, countersink, panel radius and the central panel.

A means for opening the can end or accessing the contents of the container is typically formed in a conversion process for this type of end closure. This process includes the following steps: forming a rivet by first forming a projecting bubble in the center of the panel and subsequently working the metal of the bubble into a button and into the more narrow projection of metal being the rivet; forming the tear panel by scoring the metal of the panel wall; forming an inner bead or panel on the tear panel; forming a deboss panel by bending the metal of the panel wall such that a central area of the panel wall is slightly lower than the remaining panel wall; staking the tab to the rivet; and other subsequent operations such as wipe-down steps to remove sharp edges of the tab, lettering on the panel wall by scoring, incising, or embossing (or debossing), and restriking the rivet island.

The central panel wall 12 is generally centered about a longitudinal axis 50 and has a displaceable tear panel 20 defined by a frangible score 22 and a non-frangible hinge segment. The tear panel 20 of the central panel 12 may be opened, that is the frangible score 22 may be severed and the tear panel 20 displaced at an angular orientation relative to the remaining portion of the central panel 12, while the tear panel 20 remains hinged to the central panel 12 through the hinge segment. In this opening operation, the tear panel 20 is displaced at an angular deflection. More specifically, the tear panel 20 is deflected at an angle relative to the plane of the panel 12, with the vortex of the angular displacement being the hinge segment.

The tear panel 20 is formed during the conversion process by a scoring operation. The tools for scoring the tear panel 20 in the central panel 12 include an upper die on a public side 34 having a scoring knife edge in the shape of the tear panel 20, and a lower die on a product side to support the metal in the regions being scored. When the upper and lower dies are brought together, the metal of the panel wall 12 is scored between the dies. This results in the scoring knife edge being embedded into the metal of the panel wall 12, forming the score which appears as a wedge-shaped recess in the metal. The metal remaining below the wedge-shaped recess is the residual of the score 22. Therefore, the score is formed by the scoring knife edge causing movement of metal, such that the imprint of the scoring knife edge is made in the public side 34 of the panel wall 12.

The central panel 12 further includes a tab 26. The tab 26 has a generally elongated body with a central axis A-A defined by a central cross section through the tab nose 30, and through a central webbing 42 and the lift end 32. Typical prior art container ends often have a tab 26 which is staked in the final steps of the conversion process by staking the area of the panel wall 12 adjacent and under the rivet island 46 at an angle, to bias the tab 26 such that the lift end 32 of the tab 26 rests close to the panel wall 12. The central panel 12 may also have a recess near the lift end 32 of the tab 26 to allow for easier finger access.

The opening of the tear panel 20 is operated by the tab 26 which is attached to the central panel 12 by a rivet 28, generally through a rivet hole 29. The tab 26 is attached to the central panel 12 such that the nose 30 of the tab 26 extends over a proximal portion of the tear panel 20. The lift end 32 of the tab 26 is located opposite the tab nose 30 and provides access for a user to lift the lift end 32, such as with the user's finger, to force the nose 30 against the proximal portion of the tear panel 20.

When the tab nose 30 is forced against the tear panel 20, the score 22 initially ruptures at the vent region of the score 22 of the tear panel 20. This initial rupture of the score 22 is primarily caused by the lifting force on the tab resulting in lifting of a central region of the center panel, immediately adjacent the rivet 28, which causes separation of the residual metal of the score 22. The force required to rupture the score in the vent region, typically referred to as the "pop" force, is a lower degree of force relative to the force required to propagate other regions of the score 22 by continued lifting of the lift end 32 of the tab 26. Therefore, it is preferable for the panel 12 in the area around the rivet 28 only lifts enough to assist with initial score rupture, or "pop," and remains substantially stiff and flat to provide the needed leverage for the tab 26 to propagate the scoreline of the tear panel 20. The present invention provides such optimal stiffness in the center panel, as is explained further below.

After the initial "pop", or venting of the tear panel, the user continues to lift the lift end 32 of the tab 26 which causes the tab nose 30 to be pushed downward on the tear panel 20 to continue the rupture of the score 22, as an opening force. As the opening operation is continued, the tear panel 20 is displaced downward and is rotated about the hinge region to be deflected into the container.

The tab 26 has a central webbing 42 located between the nose 30 and the lift end 32. The central webbing 42 includes a hinge region 44 and a rivet island 46 surrounding the rivet 28. An opening or void region 48 of the tab webbing 42 provides an exposed area of the central panel 12. The void region 48 has a curvilinear geometry which borders the rivet island 46 and at least partially surrounds the rivet 28, with a first end of the void region 48 being disposed generally to one side of the rivet 28, and a second end being generally disposed on an opposite side of the rivet 28. The hinge region 44 of the tab webbing 42 includes a hinge line which is defined by a substantially straight line passing between the first end and the second end of the void region 48. It may also be necessary to add material to the tab webbing 42, modify the radius of the curl, add beading, or other strengthening means to ensure that this area is strong enough wherein the tab 26 bends at the hinge region 44 during opening.

The void region 48 is within the tab webbing 42. The void region 48 may have a generally arch-shaped configuration. In this configuration, the rivet island 46 again follows the general shape of the void region 48.

The figures represent only one example of the rivet island 46 configuration. However, those individuals who are ordinary skilled in the art would understand that the rivet island 46 and the void region 48 can take any number of shapes without departing from the spirit of the invention, including but not limited to all notch or lance type rivet islands.

The webbing 42 further comprises a grab portion 54. The grab portion 54 is adapted for user manipulation. Typically, the grab portion 54 includes a finger hole 55 or the like. More recently, tabs have included fully closed grab portions onto which information or the like can be etched, stamped, or incised.

Other means for opening the can end or accessing the contents of the container include threaded closures, lug-type closures, and foil-type closures, all of which include a selectively openable closure.

Figure 3:
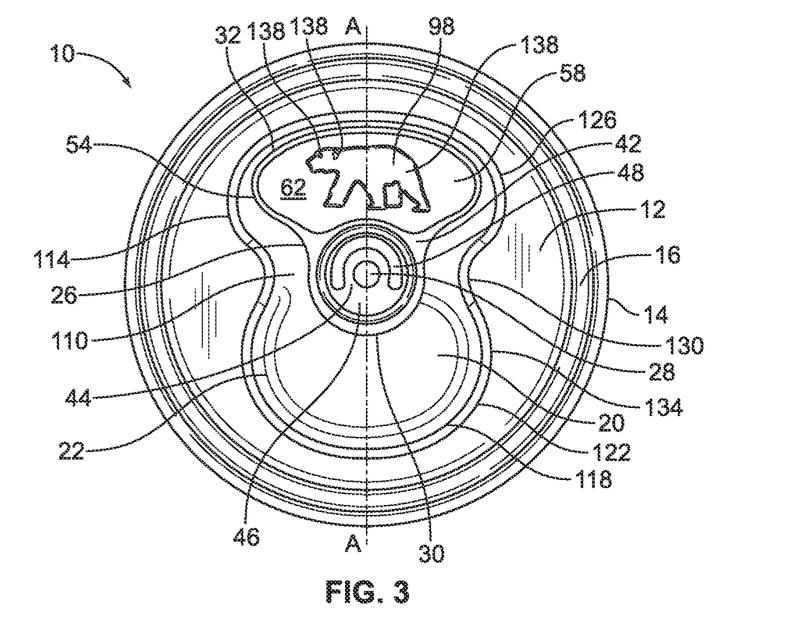
FIG. 3 is a top view of a can end of the present invention showing a so-called billboard non-detachable tab having an indicium for conveying information to a user wherein the indicium includes a temperature indicating material deposited thereon.
Figure 4:
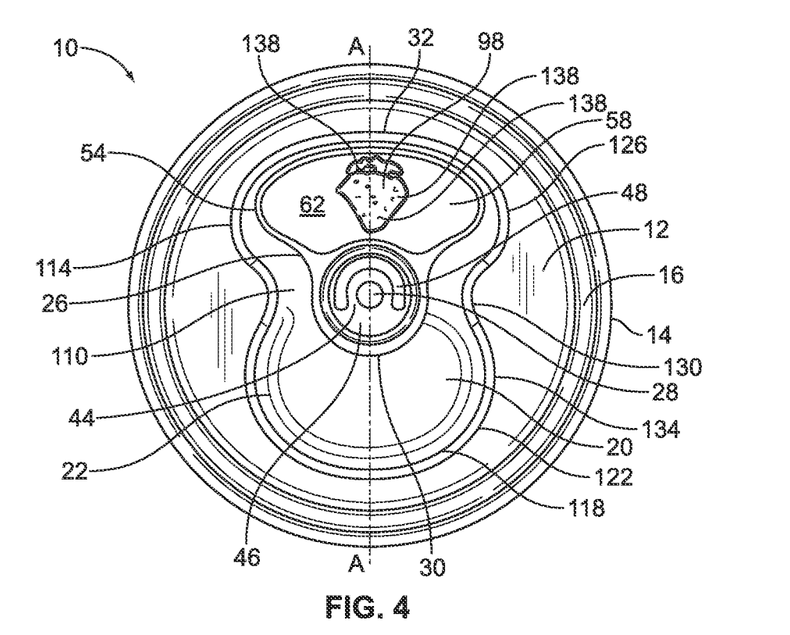
FIG. 4 is a top view of a can end of the present invention showing another so-called billboard non-detachable tab having an indicium for conveying information to a user wherein the indicium includes a temperature indicating material deposited thereon.

Referring to FIGS. 3 and 4, a tab of the present invention may include a grab portion 54 having an enclosed region defining a billboard surface 58. The billboard surface 58 is at least partially closed, and preferably fully closed. The billboard surface 58 has a top side 62 and a bottom side 66.

The grab portion 54 of the tab 26 may be strengthened by displacing the material of the central webbing located in the billboard surface by forming or reforming emboss and deboss beads on the billboard surface 58. This beading may allow the billboard surface 58, and consequently the tab 26, to be formed from a lesser volume of material than previously used to produce a like tab 26. By adding these strengthening beads to the billboard surface 58 excess metal used to roll or curl the edges of the tab 26 for strength may be reduced or altogether eliminated. This is advantageous because reducing the volume of metal used to produce any component of a beverage container is a goal of can manufacturers.

The billboard surface 58 may also comprise information carrying indicia. The billboard surface 58 includes one or more indicia 98. Accordingly, the indicia 98 are preferably tactile, including one or more relief features of the tab material made up of the emboss and deboss beads. The term "relief feature" is intended to be differentiated from incising where the material of the tab is merely stamped or marked with recessed marking of a very shallow, consistent or constant depth. "Relief features" is intended to indicate a variable depth pattern which is less consistent or constant, such as a topographical map may exhibit. This method of providing a tab with relief features allows for much more detailed imagery than ever before attained on tabs of this type which typically rely on incising, stamping or laser ablation for less remarkable imagery.

The relief features are generally present on the top and bottom sides of the billboard surface 58. Preferably, the top side 62 of the billboard surface 58 has an embossed figure while the bottom surface has a debossed figure, although this relationship can be reversed without departing from the spirit of the invention. The debossed figure is preferably substantially the negative of the embossed figure. These features are preferably created between a pair of forming, one tool engaging the top side 62 while a complementary tool engages the bottom side 66 in a female/male-type relationship. The resulting tactile indicium 98 is more highly detailed than that achieved via laser etching of an epoxy layer or that achieved via a simple stamps as disclosed in the prior art. Thus, highly detailed and more visually pleasing designs may be added to the billboard surface 58 by cold working the metal of the billboard surface 58 on the top side 62 and the bottom side 66, serving the further purpose of strengthening the tab 26 at the grab portion 54. This adds the benefit of strengthening this portion of the tab 26 and possibly allowing thinner material to be used to manufacture the tab 26. In other words, the embossed figure and the debossed figure each have profile shapes which substantially correspond to each other. The embossed figure has relief details which are the negative of relief details of the debossed figure, wherein more highly raised details of the embossed figure will have a corresponding more recessed detail on the debossed figure on the reverse side of the billboard surface 58. The result forms a more visually stimulating indicia having greater detail than achieved in tabs of this kind is a stronger grab portion provided by the forming technique described.

The grab portion 54 and the billboard surface 58 are preferably relatively large in comparison to other portions of the tab 26. For instance, the grab portion 54 may have a width measured between the widest segments of the grab portion 54 which is at least 50% wider than a width of the tab 26 as measured through a parallel segment intersecting the rivet hole 29, preferably 10% to 100% wider, more preferably 25% to 100% wider, and most preferably 50% to 100% wider, or any range or combination of ranges therein. This creates an enlarged billboard surface 58 having a similar size ratio which lends itself to the information carrying or displaying indicium or indicia, which again may also serve as stiffening beads of reformed metal. The grab portion 54 and the billboard surface 58 preferably have a fan-shaped appearance, wider at the lift end 32 of the tab 26 and tapering inwardly towards the rivet. This fan-shape also lends itself to an arcuate lift end 32 of the tab 26.

The shape of the tab 26 requires a deboss panel 110 to allow the tab 26 to fit fully within the bounds of a deboss panel profile 114. The deboss panel 110 is formed in the public side 34 of the central panel 12 using conventional die-forming techniques. The deboss panel 110 has a deboss profile 114 which is defined by an inner radius line 118 and an outer radius line 122. The deboss panel 110 may have bilateral symmetry.

The deboss profile 114 includes first and second opposing end portions joined by a pair of sidewalls. As illustrated, the deboss panel profile 114 has a first zone 126, within which the grab portion 54 is located, that is fanned outwardly from a narrower intermediate zone 130 in the vicinity of the rivet 28. The deboss profile 114 widens again in a third zone 134 where the tear panel 20 is located. The first zone 126 is at least as wide at its widest point as the third zone 134 at its widest point.

As set forth above, the can ends 10 of the present invention include information communicating indicia. In this case, the information pertains to a present temperature of and/or a past achieved temperature or temperatures. Accordingly, the can ends 10 of the present invention include one or a plurality of temperature indicating means, each activated upon reaching a predetermined temperature. An example of a temperature indicating means is a thermochromic material, such as a thermochromic ink, a layer or layers of a cured or solidified fluid containing crystals having thermochromic characteristics, or any other solid, liquid, or gas that may be deposited on a surface and which changes color or produces a pigment upon reaching a temperature or range of temperatures, including those which undergo a temporary or permanent color change upon reaching a predetermined temperature. Thermochromic materials are described in U.S. Pat. No. 5,928,126 which is hereby incorporated by reference as if fully set forth herein, especially for its color changing thermochromic material descriptions.

Figure 1:
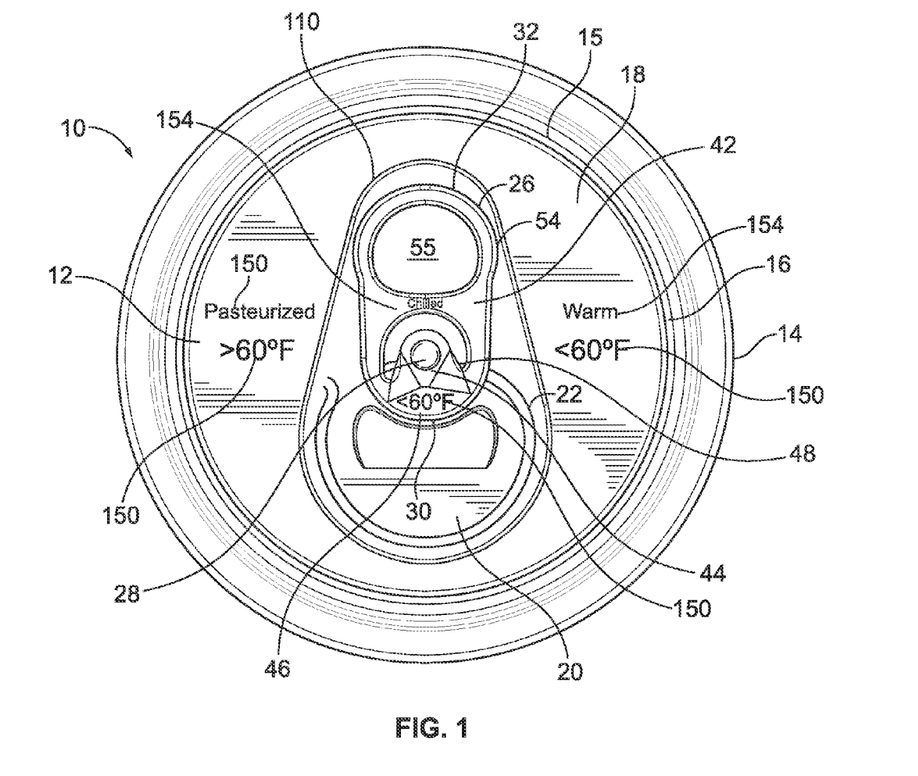
FIG. 1 is a top view of a can end of the present invention having a plurality of both present-sense and historical-sense temperature indicating materials deposited on portions of the can end including the center panel and the non-detachable tab staked to the center panel.
Figure 2:
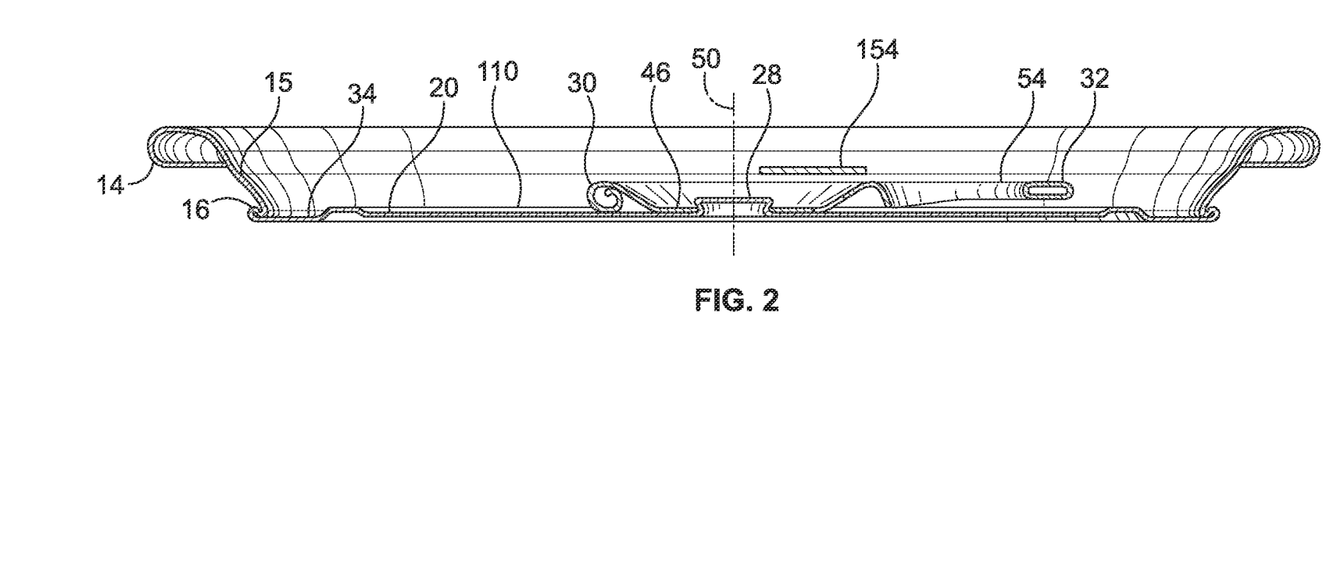
FIG. 2 is a cross-sectional view of a can end of the present invention showing a layer of a thermochromic material on the non-detachable tab.

Referring to FIG. 1, a past-sense or historical temperature indicating means 150 utilizing a permanent color change material can be used to convey information to the user regarding the historical temperature of the container and its contents. For instance, if the past-sense or historical temperature indicating means 150 is activated at a high temperature, e.g. greater than 60° F. (16° C.), the past-sense or historical temperature means can inform a user of the beverage that the container reached a desirable, e.g. to indicate proper pasteurization, or undesirable high temperature which may or may not adversely effect the taste and/or reaction of the beverage upon opening the can end 10. Similarly, if the past-sense or historical temperature indicating means is activated at a low temperature, e.g. less than 60° F. (16° C.), the past-sense or historical temperature means can inform a user of the beverage that the container reached a desirable or undesirable low temperature which also may or may not adversely effect the taste and/or reaction of the beverage upon opening the can end 10.

A present-sense temperature indicating means 154 utilizing a temporary color change material can be used to convey information to the user regarding the present temperature of the container and its contents. For instance, the present-sense temperature indicating means 154 may be activated at a high temperature, e.g. greater than 60° F. (16° C.) or at a low temperature, e.g. less than 60° F. (16° C.) to indicate the most desirable drinking temperature of the beverage therein.

The can end 10 may comprise a plurality of temperature indicating means each comprising a thermochromic material located on a portion of the metallic can end 10. Each of the plurality of temperature indicating means undergoes a color change upon reaching a predetermined temperature. At least one of the plurality of temperature indicating means preferably, but not necessarily, undergoes a color change upon reaching a temperature at least about 10° F. (6° C.) different from another of the plurality of temperature indicating means.

The temperature indicating means is preferably located on a portion of the means for opening the can end 10 or accessing the contents of the beverage. This includes threaded, lug-type, and foil closures, as well as the non-detachable tabs 26 illustrated herein.

The inventors contemplate several exemplifications using the concepts described above. In a basic example, a first temperature indicating means comprises a first thermochromic material which undergoes a color change upon reaching a first predetermined temperature. A second temperature indicating means may be added which undergoes a color change upon reaching a corresponding second predetermined temperature. The first and second predetermined temperatures are preferably different temperatures, but not necessarily so unless specified as will be described in more detail below in conjunction with an ornamental aspect of the invention.

When it is desired to communicate past-sense or historical temperature information to a user, at least one of the first temperature indicating means and the second temperature means undergoes a permanent color change upon reaching a corresponding temperature of the first predetermined temperature and the second predetermined temperature. In this way, a user would be informed that the container and/or its contents reached a desired or undesired temperature during its history. For example, a color change may indicate that the beverage was properly or chilled upon filling.

As illustrated, the can end has a third temperature indicating means of a third thermochromic material which undergoes a color change upon reaching a third predetermined temperature. This third predetermined is different from at least one of the first predetermined temperature and the second predetermined temperature. The third temperature indicating means may undergo a permanent or temporary color change as desired for the end use.

Figure 5:
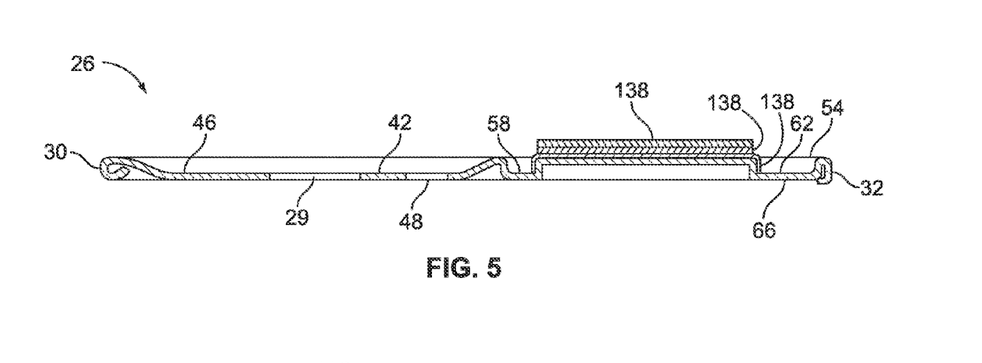
FIG. 5 is a cross-sectional view of a so-called billboard non-detachable tab having an indicium created by a beaded portion of the tab and wherein the beaded portion has a plurality of pigment layers, one or more of which can consist of a temperature indicating material.

Another example of the invention is illustrated in FIGS. 3-5. The billboard surface 58 has a pigment-carrying layer covering at least a portion of the billboard surface 58. The pigment-carrying layer 138 may be provided by resin, paint, epoxy, coating, anodizing, wax, or any other pigment-carrying solution or solid that is capable of adhering to the billboard surface 58 material, but is preferably a layer of thermochromic material as described above. The tactile indicium 98 preferably overlaps a portion of the thermochromic material. This provides further detail and a more pleasing appearance to the indicium 98. More preferably, at least one layer of the thermochromic material has a profile shape substantially matching a profile shape of the tactile indicium 98. The profile shape of the thermochromic material corresponds in size, shape, and location to a size, shape and location of the tactile indicium 98. Most preferably, the billboard surface 58 has a plurality of pigment layers 138, any of which can include a thermochromic material. Each layer 138 may be associated with a design feature on the tactile indicium 98 having a separate pigment characteristic, such as shade or color. Accordingly, the features on the tactile indicium 98 would appear and/or change color upon reaching a predetermined temperature as described above. Again, these color changes would be temporary or permanent depending on the desire of the manufacturer and/or the type of information to be conveyed to the user.

For example, as illustrated in FIG. 3, the indicium 98 may be a bear. One layer 138 may include a temperature indicating material which undergoes a change of color from black (a black bear) to white (a polar bear) upon reaching a predetermined temperature less than 60° F. (16° C.) to indicate a chilled beverage. Again, the color change may be temporary or permanent. Another way of accomplishing the information transfer is to have a first layer of a first color, e.g. black, with a second layer of a thermochromic material that is translucent until a predetermined temperature is reached. Upon reaching the predetermined temperature, the thermochromic material would change to white to indicate the temperature reached. Other examples of indicium 98 used to convey a temperature less than 60° F. could be a mountain changing to a snow capped mountain, a penguin appearing, icicles appearing, or any other symbol associated with cold or reduced temperatures.

Another example is illustrated in FIG. 4. If the tactile indicium 98 is a fruit, such as strawberry, one layer 138 may be green to indicate an unripe fruit. The layer 138 may change in color from green to another color, e.g. red, to indicate a ripened or a desired temperature having been achieved.

Thus, the tactile indicium 98 has a profile shape corresponding in size, shape and location on the billboard surface 58 to an overall profile of the plurality of pigment-carrying layers 138, and each pigment-carrying layer 138 may either be of a thermochromic material capable of permanently or temporarily changing colors upon reaching a predetermined temperature or temperatures or a standard pigment layer which does not include a temperature indicating means. The inventor further contemplates the use of laser ablation to remove the pigmented layers 138 such that portions of lower layers 138 are visible. Again, one or all of the layers 138 can be of a temperature dependent material, such as a thermochromic ink.

Figure 6:
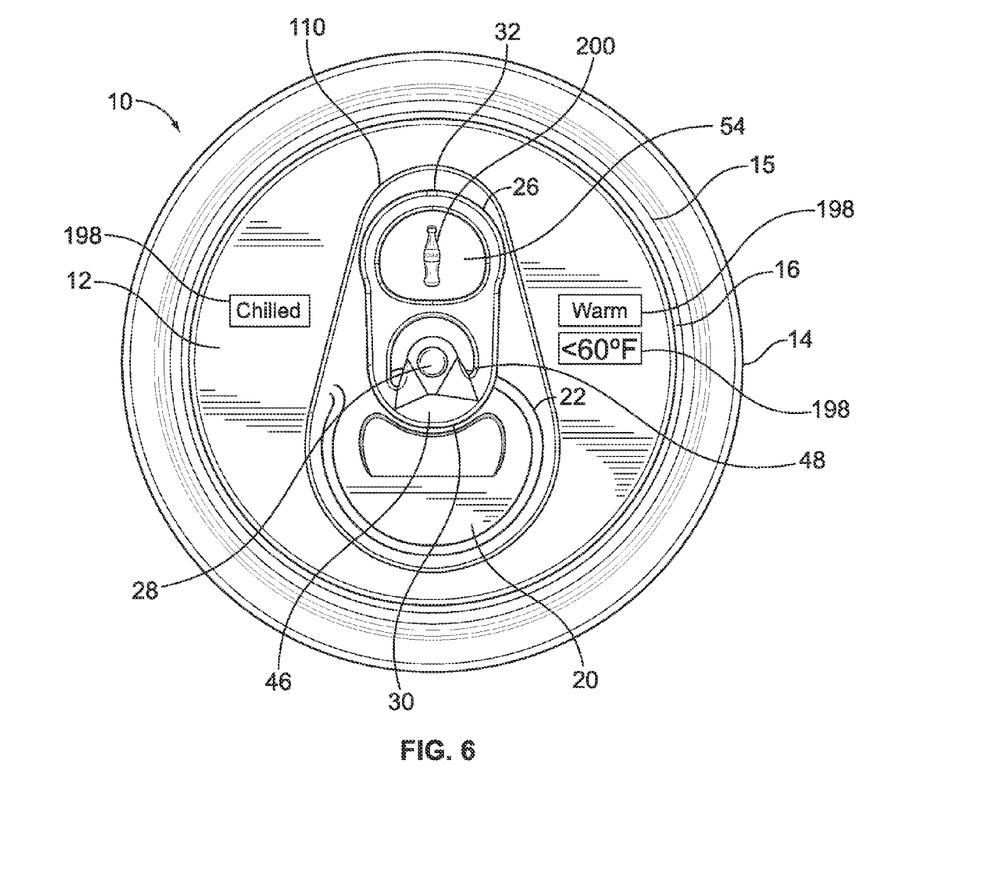
FIG. 6 is a top view of a can end of the present invention having a plurality of both present-sense and historical-sense temperature indicating materials deposited on portions of the can end including the center panel and the non-detachable tab staked to the center panel wherein a form of ablation was used to remove portions of the temperature indicting materials.

Another example is illustrated in FIG. 6. In this example, the can end 10 is imprinted with patches 198 of a thermochromic ink, portions of which may be removed or laser ablated to convey information to a user upon reaching a predetermined temperature. Again, the patches 198 can be of a temporary or permanent color change, but preferably are transparent prior to reaching the predetermined temperature(s). This can end 10 further includes a tab 26 having an enclosed grab portion 54. A symbol 200 for conveying information to a user is deposited on the enclosed grab portion 54 in a thermochromic ink such that the symbol 200 appears when a predetermined temperature is reached. Again, the symbol 200 is preferably transparent prior to reaching the predetermined temperature so that the symbol 200 is substantially invisible prior to the predetermined temperature being reached.

Figure 7:
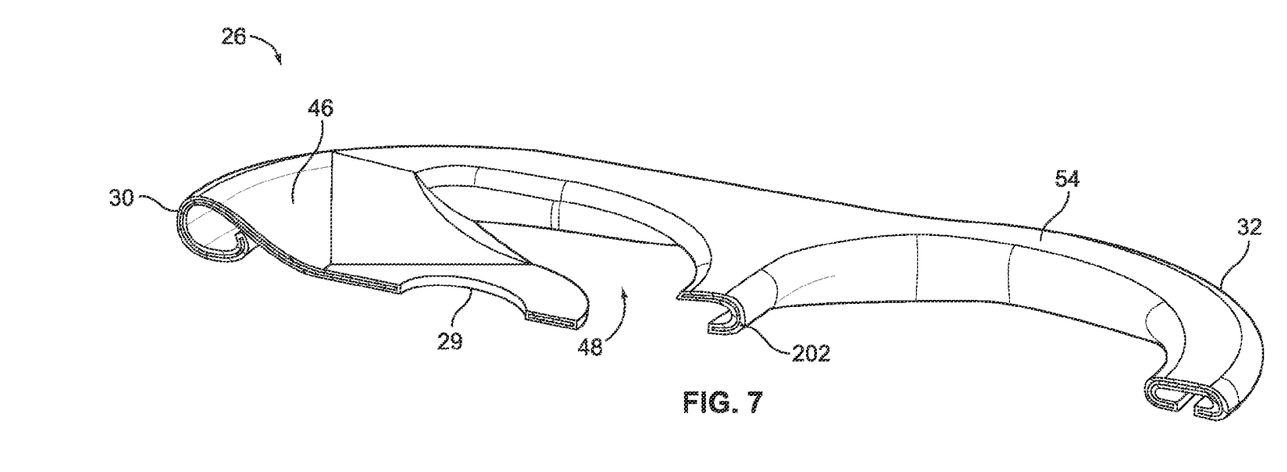
FIG. 7 is a perspective cross-sectional view of a tab having a coating comprising multiple layers of a cured fluid having thermochromic materials therein.
Figure 8:
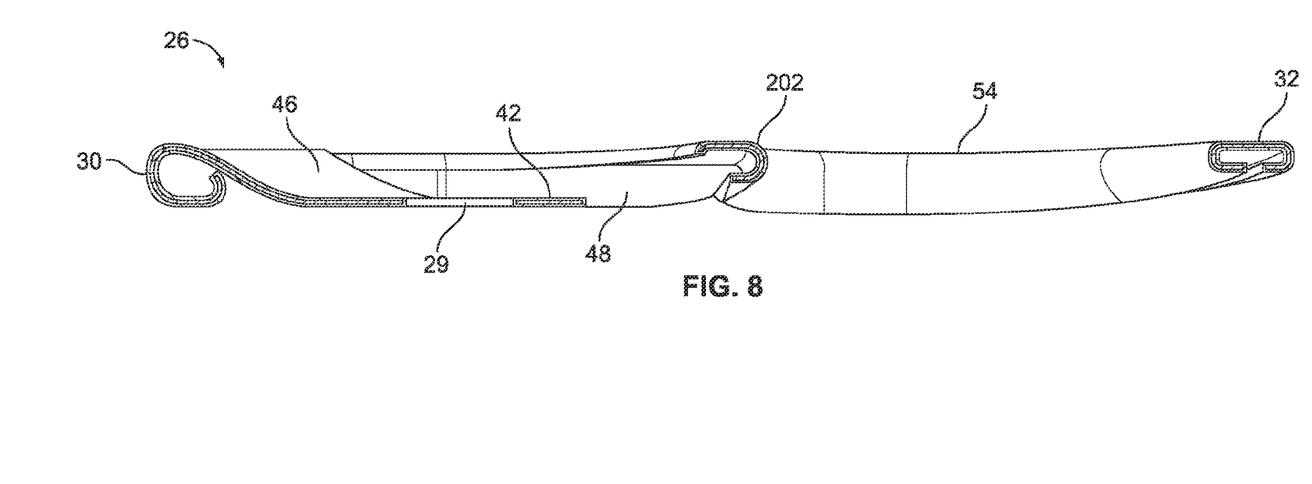
FIG. 8 is a side view cross-sectional of a tab having a coating comprising multiple layers of a cured fluid having thermochromic materials therein.

Yet another example is illustrated in FIGS. 7 and 8. Here, the tab 26 is coated in materials having thermochromic materials therein. The tab 26 has a coating 202 which may comprise one or more layers (see FIG. 5) of a cured fluid having thermochromic characteristics. The coating 202 preferably comprises a plurality of layers of cured fluids having thermochromic characteristics, more preferably the coating 202 has two layers of cured fluids having thermochromic characteristics, still more preferably the coating 202 has three layers of cured fluids having thermochromic characteristics. The coating 202 may coat the entire surface of the tab 26 and preferably has a thickness greater than 1.5 microns, more preferably 2.5 microns to 10 microns, still more preferably 2.5 microns to 5 microns, or any range or combination of ranges therein. However, applied in a plurality of layers, the coating may be greater than 5 microns, and preferably between 5 microns and 10 microns.

The coating 202, and consequently one or more of the layers, can be treated with a laser to remove sections thereof to produce a surprising or entertaining symbol which may appear or change color depending on the properties of the thermochromic material in each layer, including all of the variations thereof described above. For instance, the symbol 200 of FIG. 6 may appear or disappear or change color depending on the temperature of the tab 26, the degree of laser ablation, etc.

One of ordinary skilled in the art would understand that the principles of the present invention are readily adaptable to large opening ends and other types of beverage ends as well as the stay-on-tab ends shown in the drawings, and could be provided with food container ends as well, such as on a full open end.

Additionally, the terms "first," "second," "upper," "lower," "top," "bottom," etc. are used for illustrative purposes relative to other elements only and are not intended to limit the embodiments in any way. The term "plurality" as used herein is intended to indicate any number greater than one, either disjunctively or conjunctively as necessary, up to an infinite number. The terms "joined," "attached," and "connected" as used herein are intended to put or bring two elements together so as to form a unit, and any number of elements, devices, fasteners, etc. may be provided between the joined or connected elements unless otherwise specified by the use of the term "directly" and/or supported by the drawings.

While the specific embodiments have been illustrated and described, numerous modifications come to mind without significantly departing from the spirit of the invention, and the scope of protection is only limited by the scope of the accompanying Claims.

What is claimed is:

1. A metallic can end for a container comprising:
   a curl defining an outer perimeter of the can end;
   a wall extending downwardly from the curl;
   a strengthening member joined to a lowermost end of the wall;
   a center panel joined to the strengthening member centered about a longitudinal axis, and having a product side and a public side;
   a rivet in the center panel;
   a displaceable tear panel on the center panel at least substantially defined by a frangible score and a non-frangible hinge segment; and
   a non-detachable tab staked to the panel by the rivet, the non-detachable tab having a nose end extending over a portion of the tear panel, a lift end opposite the nose end, and a central webbing between the nose and lift end, the webbing having a hinge region and a rivet island surrounding the rivet, the rivet island being at least partially surrounded by a first void region to provide a first exposed area of the center panel;

an information conveyance and marketing coating of a cured fluid having a thickness between 2.5 and 10 microns located on the non-detachable tab comprising a first temperature indicating means comprising a first thermochromic material which undergoes a color change upon reaching a first predetermined temperature; and a tactile indicium in the form of a bead comprising relief features on the top and bottom sides of the tab created by a displaced portion of the central webbing located on an at least partially enclosed grab portion, the bead located on the substantially enclosed grab portion wherein the first temperature indicating means forms a layer on the tactile indicium.

2. The metallic can end for a container of claim 1 further comprising:

a second temperature indicating means comprising a second thermochromic material which undergoes a color change upon reaching a second predetermined temperature.

3. The metallic can end for a container of claim 2 wherein at least one of the first temperature indicating means and the second temperature means undergoes a permanent color change upon reaching a corresponding temperature of the first predetermined temperature and the second predetermined temperature.

4. The metallic can end for a container of claim 3 further comprising:

a third temperature indicating means comprising a third thermochromic material which undergoes a color change upon reaching a third predetermined temperature different from at least one of the first predetermined temperature and the second predetermined temperature.

5. The metallic can end for a container of claim 4 wherein at least two of the first temperature indicating means, the second temperature means, and the third temperature indicating means undergo a permanent color change upon reaching a corresponding temperature of the first predetermined temperature, the second predetermined temperature, and the third predetermined temperature.

6. The metallic can end for a container of claim 5 wherein one of the first, second, and third temperature means undergoing the permanent color change has a permanent color change activated at a temperature greater than 60° F.

7. The metallic can end for a container of claim 6 wherein the other of the first, second, and third temperature means undergoing the permanent color change has a permanent color change activated at a temperature less than 60° F.

8. The metallic can end for a container of claim 7 wherein at least one of the second and third temperature means is located on a portion of the can end other than the non-detachable tab.

9. The metallic can end for a container of claim 8 wherein at least two of the first, second, and third temperature indicating means are located on the non-detachable tab.

10. The metallic can end for a container of claim 6 wherein the first, second, and third temperature indicating means are located on the non-detachable tab.

11. The metallic can end for a container of claim 1 further comprising:

an at least partially enclosed grab portion of the non-detachable tab between the first void region and the lift end of the tab wherein the first temperature indicating means is located on the at least partially enclosed grab portion.

12. The metallic can end for a container of claim 11 further comprising:

a second temperature indicating means comprising a second thermochromic material which undergoes a color change upon reaching a second predetermined temperature wherein at least one of the first temperature indicating means and the second temperature means undergoes a permanent color change upon reaching a corresponding temperature of the first predetermined temperature and the second predetermined temperature and wherein the second temperature indicating means is located on the substantially enclosed grab portion.

13. The metallic can end for a container of claim 12 wherein at least one of the first temperature indicating means and the second temperature means undergoes a permanent color change upon reaching a corresponding temperature of the first predetermined temperature and the second predetermined temperature.

14. The metallic can end for a container of claim 13 wherein both the first temperature indicating means and the second temperature means form layers on the tactile indicium.

15. The metallic can end for a container of claim 14 wherein both the layers of the first temperature indicating means and the second temperature means overlap.

16. A metallic can end for a container comprising:
a curl defining an outer perimeter of the can end;
a wall extending downwardly from the curl;
a strengthening member joined to a lowermost end of the wall;
a center panel joined to the strengthening member centered about a longitudinal axis, and having a product side, a public side, rivet; and a displaceable tear panel at least substantially defined by a frangible score and a non-frangible hinge segment;
a non-detachable tab staked to the panel by the rivet, the non-detachable tab having a nose end extending over a portion of the tear panel, a lift end opposite the nose end, and a central webbing between the nose and lift end, the webbing having a hinge region and a rivet island surrounding the rivet, the rivet island being at least partially surrounded by a first void region to provide a first exposed area of the center panel;
an information conveyance and marketing coating of a cured fluid having a thickness greater than 2.5 and less than 10 microns comprising a plurality of temperature indicating means each comprising a thermochromic material located on a portion of the metallic can end, wherein each of the plurality of temperature indicating means undergoes a color change upon reaching a predetermined temperature, and wherein at least one of the plurality of temperature indicating means undergoes a color change upon reaching a temperature at least 10° F. different from another of the plurality of temperature indicating means; and
wherein an at least partially enclosed grab portion of the non-detachable tab is located between the first void region and the lift end of the tab, wherein at least one of the plurality of temperature indicating means is located on the at least partially enclosed grab portion, wherein the at least partially enclosed grab portion defines a billboard surface having a top side and a bottom side opposite the top side, and wherein a width of the non-detachable tab across the billboard surface is at least 50% greater than a width of the tab across the rivet and wherein the billboard surface comprises two or more of the plurality of temperature indicating means on a tactile indicium in the form of a bead created by a displaced portion of the central webbing located on the billboard surface generating relief features on the top and bottom sides of the tab, and wherein the tactile indicium is located on the billboard surface.

17. The metallic can end for a container of claim 16 wherein at least one of the plurality of temperature indicating means undergoes a permanent color change upon reaching a corresponding predetermined temperature.

18. The metallic can end for a container of claim 16 wherein at least one of the plurality of temperature indicating means undergoes a temporary color change upon reaching a corresponding predetermined temperature.

19. The metallic can end for a container of claim 16 wherein at least two of the plurality of temperature indicating means undergo color changes within a temperature range no greater than 10° F.

20. The metallic can end for a container of claim 16 wherein all of the plurality of temperature indicating means undergo color changes at different temperatures.

21. The metallic can end for a container of claim 20 wherein the plurality of temperature indicating means overlap each other and wherein portions of an outermost layer are removed to reveal at least one layer below the outermost layer.

22. The metallic can end for a container of claim 21 wherein the portions of an outermost layer are removed by laser ablation.

23. A non-detachable tab for a beverage container lid comprising:
   a nose end;
   a lift end opposite the nose end;
   a central webbing between the nose and lift end, the webbing having a hinge region and a rivet island surrounding a rivet hole, the rivet island being at least partially surrounded by a first void region;
   an information conveyance and marketing coating on the non-detachable tab covering the nose end, the lift end, and the central webbing of the tab wherein the coating comprises a layer of a cured fluid comprising a thermochromic material and having a thickness greater than 2.5 and less than 10 microns; and
   a tactile indicium in the form of a bead created by a displaced portion of the central webbing located on the central webbing of the tab generating relief features on the top and bottom sides of the tab, the tactile indicium located on a grab portion wherein the thermochromic material forms a layer on the tactile indicium.

24. The non-detachable tab for a beverage container lid of claim 23 wherein the coating comprises a plurality of layers of cured fluids comprising thermochromic characteristics.

25. The non-detachable tab for a beverage container lid of claim 23 wherein the coating comprises a first layer, a second layer, and a third layer, each said layer comprising a cured fluid comprising a thermochromic characteristic.

26. The non-detachable tab for a beverage container lid of claim 25 wherein each layer undergoes a change in color upon reaching a different predetermined temperature.

27. The non-detachable tab for a beverage container lid of claim 25 wherein the first layer, the second layer and the third layer undergo different color changes upon reaching a corresponding predetermined temperature.

28. The non-detachable tab for a beverage container lid of claim 25 wherein the first layer, the second layer and the third layer undergo different color changes upon reaching a corresponding predetermined temperature and wherein said corresponding predetermined temperatures are not equal.

29. The non-detachable tab for a beverage container lid of claim 25 wherein the first layer, the second layer and the third layer undergo different color changes upon reaching a corresponding predetermined temperature and wherein said corresponding predetermined temperatures are equal.

30. The non-detachable tab for a beverage container lid of claim 25 wherein portions of one or more of the first, second and third layers have been treated with a laser to ablate portions layers.

31. The non-detachable tab for a beverage container lid of claim 23 wherein the coating has a thickness between 2.5 and 5 microns.

32. The non-detachable tab for a beverage container lid of claim 23 wherein the coating has a thickness between 5 and 10 microns.

33. The non-detachable tab for a beverage container lid of claim 32 wherein the coating comprises a plurality of layers of cured fluids, each layer comprising a thermochromic material.

* * * * *

UNITED STATES PATENT AND TRADEMARK OFFICE
CERTIFICATE OF CORRECTION

| | | |
|---|---|---|
| PATENT NO. | : 8,844,747 B2 | Page 1 of 1 |
| APPLICATION NO. | : 12/727873 | |
| DATED | : September 30, 2014 | |
| INVENTOR(S) | : Michael A. Petti | |

It is certified that error appears in the above-identified patent and that said Letters Patent is hereby corrected as shown below:

On the Title Page, item (54) and in the Specification, Column 1, Line 1, Title, Before "AND" insert -- ORNAMENTAL --

Signed and Sealed this
Twenty-fourth Day of March, 2015

Michelle K. Lee
*Director of the United States Patent and Trademark Office*